(12) United States Patent
Jahanbin et al.

(10) Patent No.: US 11,255,820 B2
(45) Date of Patent: Feb. 22, 2022

(54) PATCH FOR IN-SITU MONITORING OF STRUCTURES

(71) Applicant: THE BOEING COMPANY, Chicago, IL (US)

(72) Inventors: Shahrooz M. Jahanbin, Mukilteo, WA (US); Gary E. Georgeson, Tacoma, WA (US)

(73) Assignee: THE BOEING COMPANY, Chicago, IL (US)

( * ) Notice: Subject to any disclaimer, the term of this patent is extended or adjusted under 35 U.S.C. 154(b) by 149 days.

(21) Appl. No.: 16/249,361

(22) Filed: Jan. 16, 2019

(65) Prior Publication Data

US 2020/0225191 A1 Jul. 16, 2020

(51) Int. Cl.
*G01N 29/04* (2006.01)
*G01N 29/11* (2006.01)
*G01N 29/12* (2006.01)
*G01N 29/07* (2006.01)
*G01N 29/34* (2006.01)
*G01N 29/42* (2006.01)

(52) U.S. Cl.
CPC ........... *G01N 29/043* (2013.01); *G01N 29/07* (2013.01); *G01N 29/11* (2013.01); *G01N 29/12* (2013.01); *G01N 29/348* (2013.01); *G01N 29/42* (2013.01); *G01N 2291/0231* (2013.01)

(58) Field of Classification Search
CPC ...... G01N 29/043; G01N 29/07; G01N 29/11; G01N 29/12; G01N 29/227; G01N 29/228; G01N 29/223; G01N 29/045; G01N 29/2475; G01N 29/348; G01N 29/42
See application file for complete search history.

(56) References Cited

U.S. PATENT DOCUMENTS

| | | | | |
|---|---|---|---|---|
| 5,195,046 A | * | 3/1993 | Gerardi | B64D 15/16 702/35 |
| 6,006,163 A | * | 12/1999 | Lichtenwalner | G01H 5/00 702/34 |
| 6,370,964 B1 | * | 4/2002 | Chang | G01B 5/30 73/862.046 |
| 7,024,315 B2 | * | 4/2006 | Giurgiutiu | G01N 29/11 702/33 |
| 7,231,826 B2 | | 6/2007 | Bossi et al. | |
| 7,249,512 B2 | | 7/2007 | Kennedy et al. | |

(Continued)

*Primary Examiner* — Helen C Kwok
(74) *Attorney, Agent, or Firm* — Patterson + Sheridan, LLP (57) ABSTRACT

Aspects provide for in-situ monitoring of a structure, such as a portion of an in-operation vehicle, by a patch and controller by transmitting, at a first time, a first signal from a first transceiver of a plurality of transceivers in contact with the structure; receiving the first signal carried in the structure at a second transceiver of the plurality of transceivers at a known distance from the first transceiver; determining a baseline signal characteristic of the first signal as received at the second transceiver; transmitting, at a second time, a second signal from the first transceiver; receiving the second signal carried in the structure at the second transceiver; determining a diagnostic signal characteristic of the second signal as received at the second transceiver; and in response to determining that a difference between the baseline signal characteristic and the diagnostic signal characteristic exceeds a threshold, generating an alert.

20 Claims, 9 Drawing Sheets

(56) References Cited

U.S. PATENT DOCUMENTS

| | | | |
|---|---|---|---|
| 7,398,698 B2 * | 7/2008 | Griess | G01M 5/0033 |
| | | | 702/36 |
| 7,458,266 B2 * | 12/2008 | Beard | G01N 29/043 |
| | | | 702/39 |
| 7,487,066 B2 * | 2/2009 | Sundermeyer | A01B 63/00 |
| | | | 702/182 |
| 7,668,665 B2 * | 2/2010 | Kim | G01H 9/004 |
| | | | 702/33 |
| 7,953,559 B2 * | 5/2011 | Sundermeyer | G01N 3/32 |
| | | | 702/183 |
| 8,521,444 B2 * | 8/2013 | Banerjee | G01M 5/0033 |
| | | | 702/34 |
| 9,085,052 B1 * | 7/2015 | Georgeson | G01K 13/00 |
| 9,239,315 B1 * | 1/2016 | Georgeson | G01N 29/04 |
| 9,382,018 B2 * | 7/2016 | Roux | B64F 5/40 |
| 2002/0190729 A1 * | 12/2002 | Wilson | G01N 17/02 |
| | | | 324/663 |
| 2005/0068041 A1 * | 3/2005 | Kress | G01N 29/2475 |
| | | | 324/527 |
| 2007/0017297 A1 * | 1/2007 | Georgeson | G01N 29/069 |
| | | | 73/801 |
| 2007/0095160 A1 * | 5/2007 | Georgeson | G01N 29/0645 |
| | | | 73/866 |
| 2007/0282541 A1 * | 12/2007 | Griess | H04Q 9/00 |
| | | | 702/34 |
| 2008/0000299 A1 * | 1/2008 | Georgeson | G01N 29/0645 |
| | | | 73/606 |
| 2009/0048789 A1 * | 2/2009 | Yu | G01N 29/348 |
| | | | 702/39 |
| 2015/0231837 A1 * | 8/2015 | Georgeson | B29C 73/14 |
| | | | 428/136 |
| 2015/0367586 A1 * | 12/2015 | Georgeson | B06B 1/0688 |
| | | | 367/140 |

* cited by examiner

PATCH FOR IN-SITU MONITORING OF STRUCTURES

FIELD

The present disclosure relates to material structural monitoring, and more specifically, to monitoring structural health via a patch that is selectively attachable to a surface of a structure of a system/craft to monitor the characteristics of the material beneath the surface while the system/craft is operational.

BACKGROUND

Because imperfections in structures may not be detectable by visual inspection, especially for imperfections that are sub-surface, operators often use various tools or sensors to check for imperfections. These tools and sensors can indicate a scope or extent of an imperfection and may be used as part of a preventative maintenance regime, in response to an event suspected of introducing an imperfection, or during an inspection process in manufacturing. The structures may include various arrest mechanisms to limit the extent of an imperfection, and may be made of a solid material or several layers of materials arranged in a laminate structure.

SUMMARY

The present disclosure provides a patch device in one aspect, the patch device including: a mounting area; a first plurality of ultrasound transceivers mounted at a first plurality of locations around a perimeter of the mounting area, wherein the first plurality of locations are spaced to provide a plurality of known distances between the first plurality of ultrasound transceivers across the mounting area; and an adhesive layer disposed on the mounting area, configured to temporarily secure the mounting area to a surface of a structure and hold the first plurality of ultrasound transceivers in contact with the surface.

In one aspect, in combination with any example patch device above or below, a material comprising the mounting area is selected as a different material from the structure.

In one aspect, in combination with any example patch device above or below, the patch device further comprises a second plurality of ultrasound transceivers at a second plurality of locations around the perimeter of the mounting area, wherein the second plurality of locations are spaced to provide a plurality of known distances between the second plurality of ultrasound transceivers across the mounting area, wherein the first plurality of ultrasound transceivers are configured to transmit and receive signals in a first bandwidth that propagate at a first depth in the structure and the second plurality of ultrasound transceivers are configured to transmit and receive signals in a second bandwidth that propagate at a second depth in the structure different than the first depth.

In one aspect, in combination with any example patch device above or below, the first plurality of ultrasound transceivers comprises two ultrasound transceivers located on opposite sides of the mounting area.

In one aspect, in combination with any example patch device above or below, a face of the mounting area held in contact with the surface is coplanar with portions of the ultrasound transceivers held in contact with the surface.

The present disclosure provides a system in one aspect, the system including: a diagnostic patch, including: a plurality of transceivers located at known distances from one another around a perimeter of the diagnostic patch; and a mounting area configured to selectively secure the diagnostic patch to a surface of a structure and hold the plurality of transceivers in contact with the surface; and a controller in communication with the diagnostic patch, the controller configured to: cause the plurality of transceivers to transmit a corresponding plurality of baseline signals into the structure; interpret the plurality of baseline signals as received by the plurality of transceivers to determine a baseline effect of an imperfection in the structure on signal characteristics; cause the plurality of transceivers to transmit a corresponding plurality of diagnostic signals into the structure; interpret the plurality of diagnostic signals as received by the plurality of transceivers to determine a diagnostic effect of the imperfection on the signal characteristics; and in response to a difference between the baseline effect and the diagnostic effect exceeding a threshold, generate an alert.

In one aspect, in combination with any example system above or below, the controller is further configured to: cause a first subset of the plurality of transceivers to transmit the corresponding plurality of baseline signals and the corresponding plurality of diagnostic signals at a first frequency; and cause a second subset of the plurality of transceivers to transmit the corresponding plurality of baseline signals and the corresponding plurality of diagnostic signals at a second frequency different from the first frequency.

In one aspect, in combination with any example system above or below, the difference between the baseline effect and the diagnostic effect identifies at least one of: a change in signal amplitude; a change in signal time-of-flight; a change in a frequency response; and a change in signal reflections from the imperfection.

In one aspect, in combination with any example system above or below, to cause the plurality of transceivers to transmit the corresponding plurality of baseline signals into the structure, the controller is configured to: select one transceiver of the plurality of transceivers to use as a transmitter in a first time window; transmit one baseline signal of the plurality of baseline signals during the first time window; receive the one baseline signal at remaining transceivers of the plurality of transceivers during the first time window; and cycle to a different one transceiver of the plurality of transceivers to use as the transmitter in a subsequent time window.

In one aspect, in combination with any example system above or below, the threshold is a dynamic threshold for a rate of growth in the imperfection from the baseline effect.

The present disclosure provides a method of in-situ monitoring of structures in one aspect, the method including: transmitting, at a first time, a first ultrasound signal from a first transceiver of a first plurality of transceivers in contact with a structure; receiving the first ultrasound signal carried in the structure at a second transceiver of the first plurality of transceivers at a known distance from the first transceiver; determining a baseline signal characteristic of the first ultrasound signal as received at the second transceiver; transmitting, at a second time, a second ultrasound signal from the first transceiver of the first plurality of transceivers; receiving the second ultrasound signal carried in the structure at the second transceiver; determining a diagnostic signal characteristic of the second ultrasound signal as received at the second transceiver; and in response to determining that a difference between the baseline signal characteristic and the diagnostic signal characteristic exceeds a threshold, generating an alert.

In one aspect, in combination with any example method above or below, the method includes: affixing the first transceiver and the second transceiver to a surface of the structure via a patch having a face defining the known distance between the first transceiver and the second transceiver and including an adhesive layer mounting the face to the structure, wherein the first transceiver and the second transceiver are located on a perimeter of the patch.

In one aspect, in combination with any example method above or below, the patch is made of a material different from the structure.

In one aspect, in combination with any example method above or below, the method includes receiving the first ultrasound signal carried in the structure at a third transceiver of the first plurality of transceivers at a second known distance from the first transceiver; determining a second baseline signal characteristic of the first ultrasound signal as received at the third transceiver; receiving the second ultrasound signal carried in the structure at the third transceiver; determining a second diagnostic signal characteristic of the second ultrasound signal as received at the third transceiver; and in response to determining that a difference between the second baseline signal characteristic and the second diagnostic signal characteristic exceeds the threshold, generating a second alert.

In one aspect, in combination with any example method above or below, the method includes: transmitting, at a third time, a third ultrasound signal from a third transceiver of a second plurality of transceivers in contact with the structure; receiving the third ultrasound signal carried in the structure at a fourth transceiver of the second plurality of transceivers at a second known distance from the third transceiver; determining a second baseline signal characteristic of the third ultrasound signal as received at the fourth transceiver; transmitting, at a fourth time, a fourth ultrasound signal from the third transceiver of the second plurality of transceivers; receiving the fourth ultrasound signal carried in the structure at the fourth transceiver; determining a second diagnostic signal characteristic of the fourth ultrasound signal as received at the fourth transceiver; and in response to determining that a second difference between the second baseline signal characteristic and the second diagnostic signal characteristic exceeds the threshold, generating a second alert.

In one aspect, in combination with any example method above or below, the method includes: transmitting, at a third time, a third ultrasound signal from the second transceiver of the first plurality of transceivers in contact with the structure; receiving the third ultrasound signal carried in the structure at the first transceiver of the first plurality of transceivers at the known distance from the second transceiver; determining a second baseline signal characteristic of the third ultrasound signal as received at the first transceiver; transmitting, at a fourth time, a fourth ultrasound signal from the second transceiver of the first plurality of transceivers; receiving the fourth ultrasound signal carried in the structure at the first transceiver; determining a second diagnostic signal characteristic of the fourth ultrasound signal as received at the first transceiver; and in response to determining that a second difference between the second baseline signal characteristic and the second diagnostic signal characteristic exceeds the threshold, generating a second alert.

In one aspect, in combination with any example method above or below, the difference between the baseline signal characteristic and the diagnostic signal characteristic indicates at least one of: a change in signal strength from the first time to the second time; a change in signal propagation speed through the structure from the first time to the second time; a change in a frequency response; and a change in signal reflections from an imperfection included in the structure.

In one aspect, in combination with any example method above or below, the structure is a component of a vehicle that is in operation at the second time.

In one aspect, in combination with any example method above or below, ultrasound signals are transmitted and received at known times and signal characteristics of the ultrasound signals are stored in association with operational phases of the vehicle that correspond to the known times.

In one aspect, in combination with any example method above or below, the threshold is a dynamic threshold to identify a rate of growth in an imperfection included in the structure from the first time to the second time.

In one aspect, in combination with any example method above or below, the ultrasound signals are transmitted and received in a pitch-catch arrangement in which each transceiver of the first plurality of transceivers transmits a diagnostic signal in a given time window to remaining transceivers of the first plurality of transceivers.

BRIEF DESCRIPTION OF THE DRAWINGS

So that the manner in which the above recited features can be understood in detail, a more particular description, briefly summarized above, may be had by reference to example aspects, some of which are illustrated in the appended drawings.

DETAILED DESCRIPTION

A diagnostic patch is provided for the in-situ monitoring of structures and any imperfections present therein, which may be used during the operation of the system to which the structure belongs. Because technicians may not be able to visually inspect or access the structure when the system is in operation, and some imperfections may not be visible from the surface, the diagnostic patch provides for non-visual inspection of a structure that may include subsurface imperfections of that structure. A series of ultrasound transceivers are held in contact with the structure to inspect the material of the structure and alert a user to imperfections beyond a certain threshold (e.g., size, location, number) or that are growing beyond a threshold rate of growth. The diagnostic patch further provides additional support or protection to the structure; arresting the growth of any imperfections and shielding the surface from impactors. By providing a diagnostic patch that is temporarily securable to a structure during operation, the material health of the structure may be observed and correlated to the various operational phases and conditions experienced by the structure.

Figure 1:
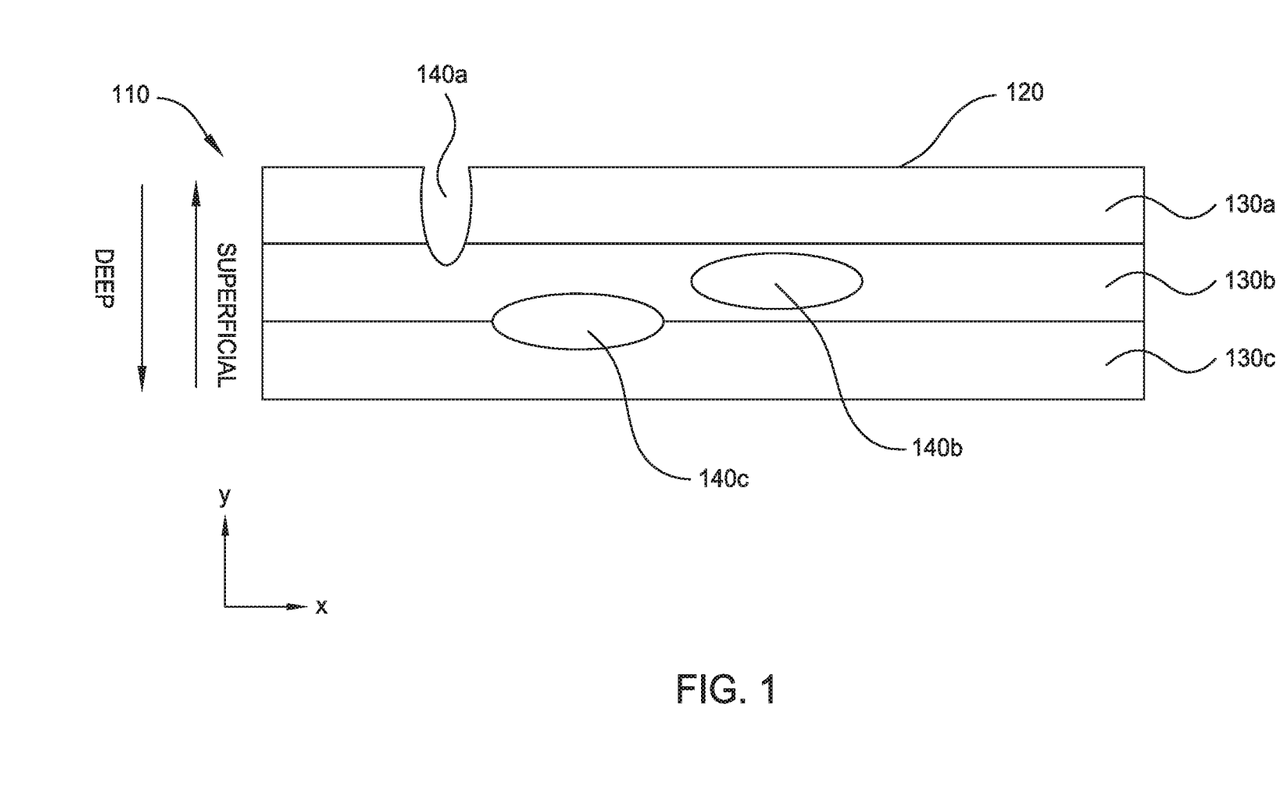
FIG. 1 illustrates a cross section of a structure, according to aspects of the present disclosure.

FIG. 1 illustrates a cross section of a structure 110 in a first plane (e.g., the XY plane). The structure 110 represents a portion of a craft, device, system, or apparatus, such as a wing or fuselage of an aircraft, a hull of a ship, a body of a car, a wall of a building, a pane of a window, etc. that is being monitored for imperfections 140 near to the surface 120 of the structure 110. As illustrated, the structure 110 is made of a laminate material with several layers 130a-c (generally, layer 130) bonded together, although the present disclosure is applicable to structures 110 made of solid (i.e., non-laminate) materials comprising one layer or structures 110 in which only the first layer 130a is analyzed.

As used herein, the terms "underneath," "under," "below," and "deep" are directional indicators that convey a position of a particular element or feature relative to a given surface 120 independently of the orientation of that surface as being further from that surface 120 relative to another element or feature, which may be described as "above," "over," or "superficial to" the particular element. A feature that is referred to as "deep" to another feature may still be close to the surface 120, but shall be understood to be further from the surface 120 than that other feature. For example, in FIG. 1, the first layer 130a is superficial to the second layer 130b relative to the surface 120, and the third layer 130c is underneath (i.e., deep to) the second layer 130b relative to the surface 120. As structures 110 are three-dimensional, and may have several surfaces 120 and several internal layers 130, a first feature may be deep relative to a second feature based on one reference surface and superficial relative to the second feature based on a different reference surface on an opposite side of the structure 110 from the first surface.

For purposes of illustration, three imperfections 140a-c (generally, imperfection 140) are shown in the structure 110. An imperfection 140 may extend to the surface 120 of the structure 110, such as the first imperfection 140a, or may be underneath (i.e., deep to) the surface 120, such as the second imperfection 140b and the third imperfection 140c. In various aspects, an imperfection may include an absence of material (e.g., voids, chips, cracks), an inclusion of an undesired material (e.g., air bubbles, debris, contaminants), or a material nonconformance (e.g., missed/broken bonds, material matrix differences, over/under thicknesses), which may occur in one layer (as per the second imperfection 140b), between two layers (as per the third imperfection 140c), or across several layers (as per the first imperfection 140a).

Depending on the size of the imperfection 140, location of the imperfection 140 in the structure 110 (and transmissivity of the structure 110 to light), and any secondary effects of the imperfection 140 (e.g., bubbling, warping, discoloration), the presence or extent of a given imperfection 140 may not be discernable via visual inspection alone. The present disclosure therefore provides for a diagnostic patch (also referred to as a patch or patch device) that is selectively and removably securable to a structure 110 to detect and monitor the growth of existing imperfections 140. In various aspects, the diagnostic patch is further able to shield the structure 110 from further imperfections 140 and arrest the growth of existing imperfections 140.

Figure 2A:
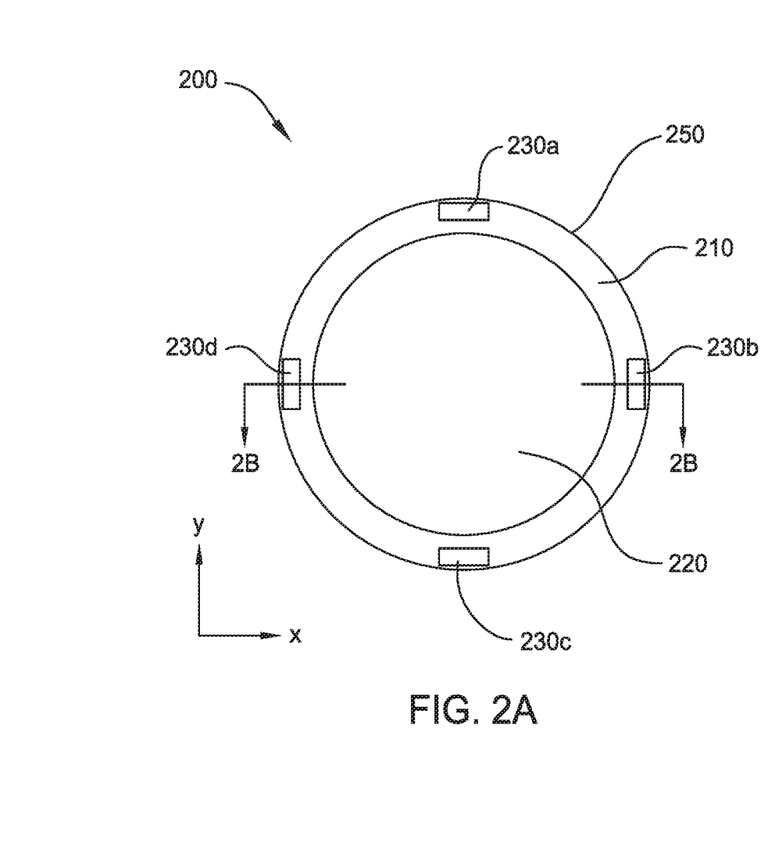
FIGS. 2A and 2B illustrate a diagnostic patch with a circular cross section, according to aspects of the present disclosure.
Figure 2B:
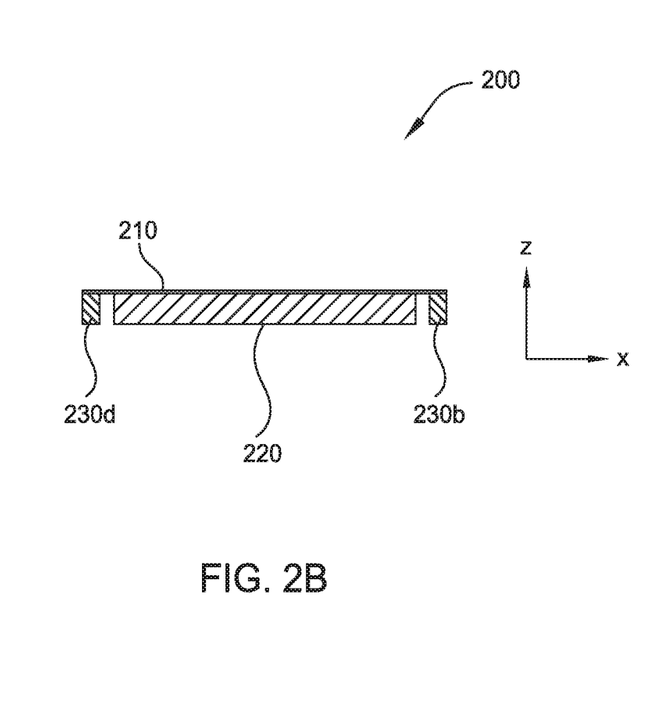
Figure 3A:
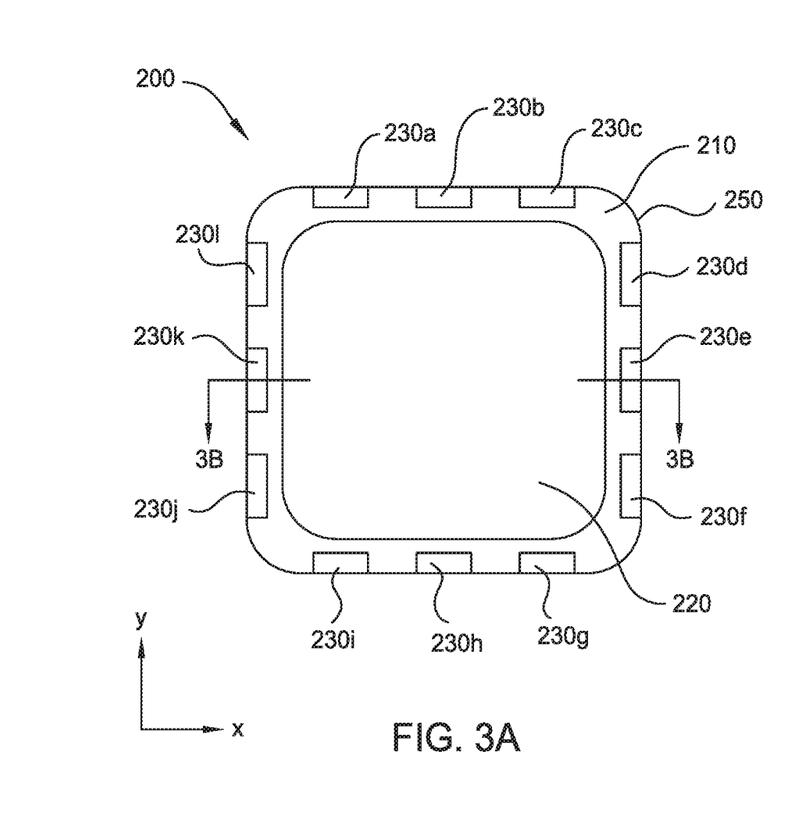
FIGS. 3A and 3B illustrate a diagnostic patch with a rounded rectangular cross section, according to aspects of the present disclosure.
Figure 3B:
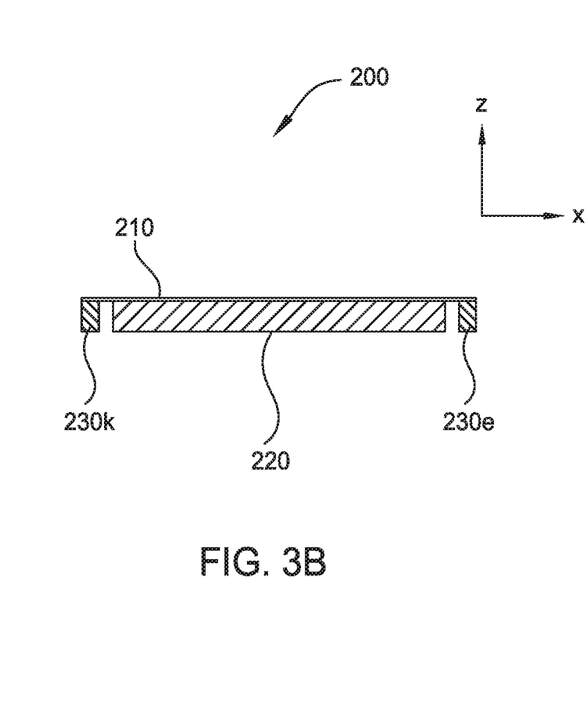

FIGS. 2A and 2B illustrate a diagnostic patch 200 with a circular cross section. FIGS. 3A and 3B illustrate a diagnostic patch 200 with a rounded rectangular cross section. Each diagnostic patch 200 includes a body 210 with a perimeter 250 that defines the cross sectional shape of the diagnostic patch 200. As will be appreciated, diagnostic patches 200 may be provided with cross sections in various shapes, of which FIGS. 2A, 2B, 3A, and 3B are non-limiting examples. Other non-limiting examples of cross section shapes for a patch 200 include: irregular polygonal shapes, ovoid shapes, triangular shapes, quadrilateral shapes; rounded triangular shapes (i.e., a triangular shape with rounded corners); and rounded quadrilateral shapes (i.e., a quadrilateral shape with rounded corners).

The body 210 of the diagnostic patch 200 includes a mounting area 220 that affixes the patch 200 to the portion of the structure 110 to be monitored. In various aspects, the mounting area 220 includes an adhesive layer that is exposed by removing a protective layer (e.g., a barrier or seal) when affixing the diagnostic patch 200 to the structure 110. In other aspects, a technician applies an adhesive compound (or multiple adhesive compounds), such as an epoxy, to the mounting area 220 or the structure 110 when affixing or securing the diagnostic patch 200 to the structure 110. In other aspects, the mounting area 220 includes magnets (permanent or electromagnetic) typically in addition to a coupling medium that may optionally provide adhesive capabilities in order to affix the diagnostic patch 200 to the structure 110 via an electromagnetic bond to supplement an adhesive bond. In various aspects, the material of the body 210 (including the mounting area 220), and the means of affixing the mounting area 220 to the surface 120 are selected based on the material of the structure 110. In some aspects, the material of the mounting area 220 is selected to provide different transmission characteristics from the material of the structure 110, so as to act as a waveguide for signals carried in the material of the structure 110.

A plurality of transceivers 230 are mounted along the perimeter 250 of the patch 200. Depending on the size and shape of the patch 200, a different number of transceivers 230 (but at least two) may be included in the plurality of transceivers 230. For example, the patch 200 illustrated in FIGS. 2A and 2B includes four transceivers 230a-d, while the patch 200 illustrated in FIGS. 3A and 3B includes twelve transceivers 230a-l. In various aspects, a patch 200 may include as few as two transceivers 230 that are located on opposite sides of the patch 200 relative to one another, or any number of transceivers 230 greater than two. In various aspects, the plurality of transceivers 230 may include an even number or an odd number of transceivers 230. The transceivers 230 are mounted to the patch 200 at known distances from one another, and may be spaced regularly or irregularly around the perimeter 250.

The transceivers 230 are transmitters and receivers that generate and receive signals propagated through the structure 110. As the signal generated by one transceiver 230 is carried through the structure 110, the signal interacts with the various boundaries between layers 130, the boundary between the surface 120 and the mounting area, and any imperfections 140 includes in the structure 110 in the wavepath of the signal. The other transceivers 230 of the plurality of transceivers 230 receive this signal, and compare the characteristics of the received signal to the transmitted signal and prior iterations of the received signal to detect the presence, extent, or growth of imperfections 140 in the structure 110.

In some aspects, the transceivers 230 are PZT (Lead Zirconate Titanate) piezoelectric ceramic disks that generate and receive ultrasound waves for monitoring the health of an underlying structure 110. The transceivers 230 operate in a pitch-catch arrangement, where one transceiver 230 generates a signal at a given time for the other transceivers 230 of the plurality to receive and analyze. In various aspects, a transceiver 230 that generates a signal at a first time may act to receive a signal generated from another transceiver 230 at a second time. In some aspects, the transceivers 230 are ultrasound transceivers that generate/receive ultrasound signals with frequencies between roughly 1-10 MHz (megahertz) (±10%).

The transceivers 230 are tuned for an effective wavelength to penetrate the structure 110 to a particular depth as an interface wave. The wave velocity v is based on the speed of propagation in the material of the structure 110 being monitored. By knowing the wave velocity of v, a user may tune a frequency of f at which the transceivers 230 generate/receive signals to affect the depth of penetration to a wavelength λ according to Formula 1.

$$\lambda = v/f \quad \text{[Formula 1]}$$

For example, with a signal generated at a frequency f of 100 MHz, and a speed of propagation v in the material of the structure 110 of 100 in/µs (inches per microsecond) (roughly, 2.54 meters per microsecond), the wavepath penetrates 1 inch (roughly, 254 mm (millimeters)) deep to the surface 120 (100 in/µs÷100 MHz). A user may tune the transceivers 230 to a different frequency f to penetrate to a different depth in the structure 110, or may apply the transceivers 230 to a structure 110 whose speed of propagation v is different to penetrate to a different depth in that structure 110.

In some aspects, one patch 200 includes several different pluralities of transceivers 230 that are tuned to generate and receive signals with different characteristics. For example, the patch 200 in FIGS. 3A and 3B may include a first plurality of transceivers 230 (including transceivers 230$a$, 230$d$, 230$g$, and 230$j$), a second plurality of transceivers 230 (including transceivers 230$b$, 230$e$, 230$h$, and 230$k$), and a third plurality of transceivers 230 (including transceivers 230$c$, 230$f$, 230$i$, and 230$l$) that are each tuned to a different wavelength, signal strength, and/or effective depths of penetration of the structure 110. Each of the pluralities may be used in structures 110 of different materials to analyze each structure 110 to the same depth, or may be used on one structure 110 to analyze different depths of the one structure 110.

Figure 4:
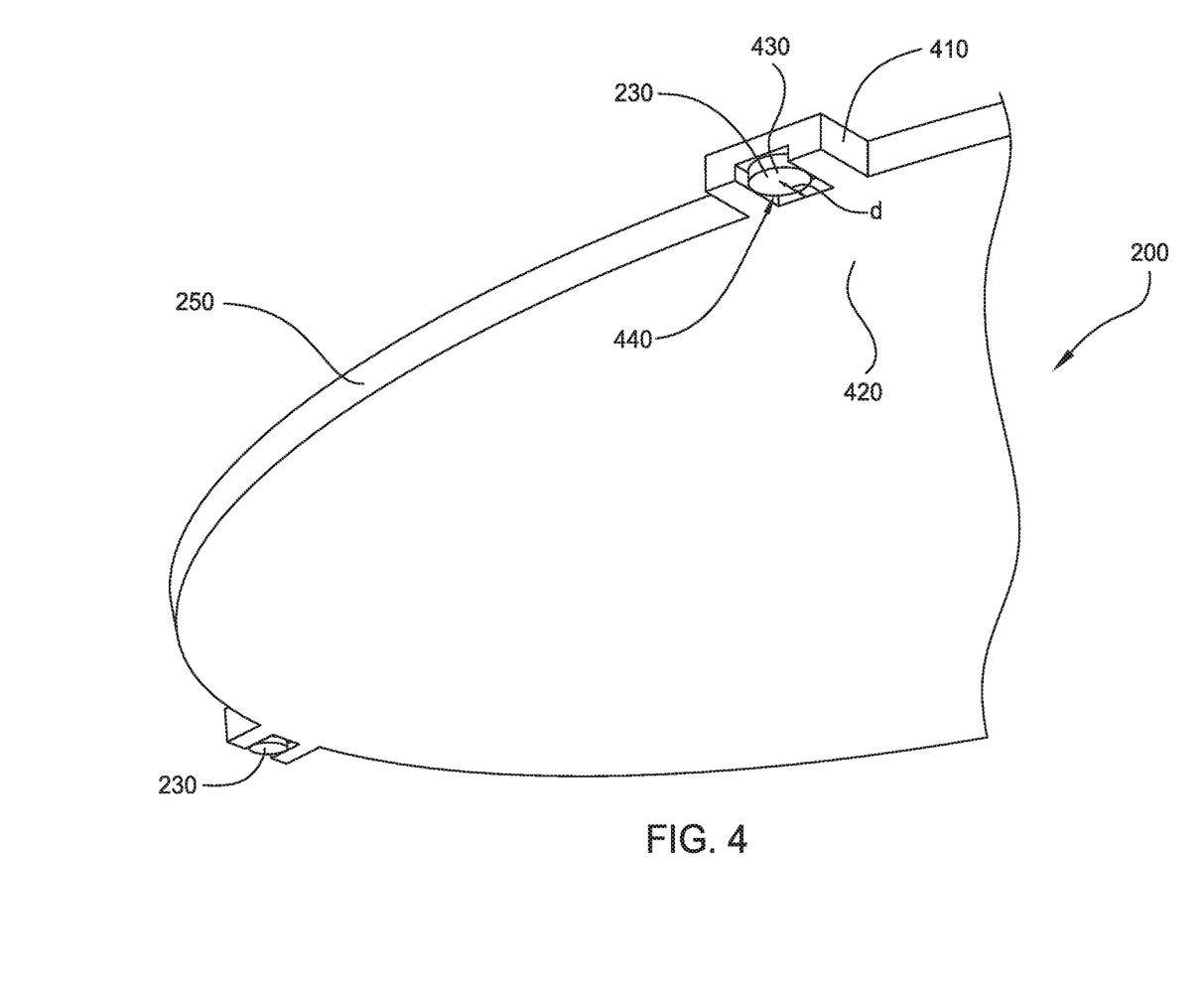
FIG. 4 illustrates an isometric view of a diagnostic patch, according to aspects of the present disclosure.

FIG. 4 illustrates an isometric view of a diagnostic patch 200 that details the connection of a transceiver 230 to the perimeter 250 of the diagnostic patch 200. In various aspects, the transceivers 230 are mounted to the perimeter 250 of the patch 200 by integrated mounts 410 that hold the transceivers 230 in place and incorporate wiring to connect the transceivers 230 to power sources, alert indicators, and a controller (discussed in greater detail in regard to FIG. 6).

The face 420 of the mounting area 220 is coplanar with the faces 430 of the transceivers 230 so that when the mounting area 220 is affixed to the surface 120, the transceiver faces 430 are held in contact with the surface 120. In aspects in which the integrated mounts 410 extend from the perimeter 250 of the patch 200, the center of the transceivers 230 are held at an offset 440 of a known distance from the perimeter 250, which in some aspects is a multiple of the wavelength λ that the transceivers 230 are tuned to.

Figure 5A:
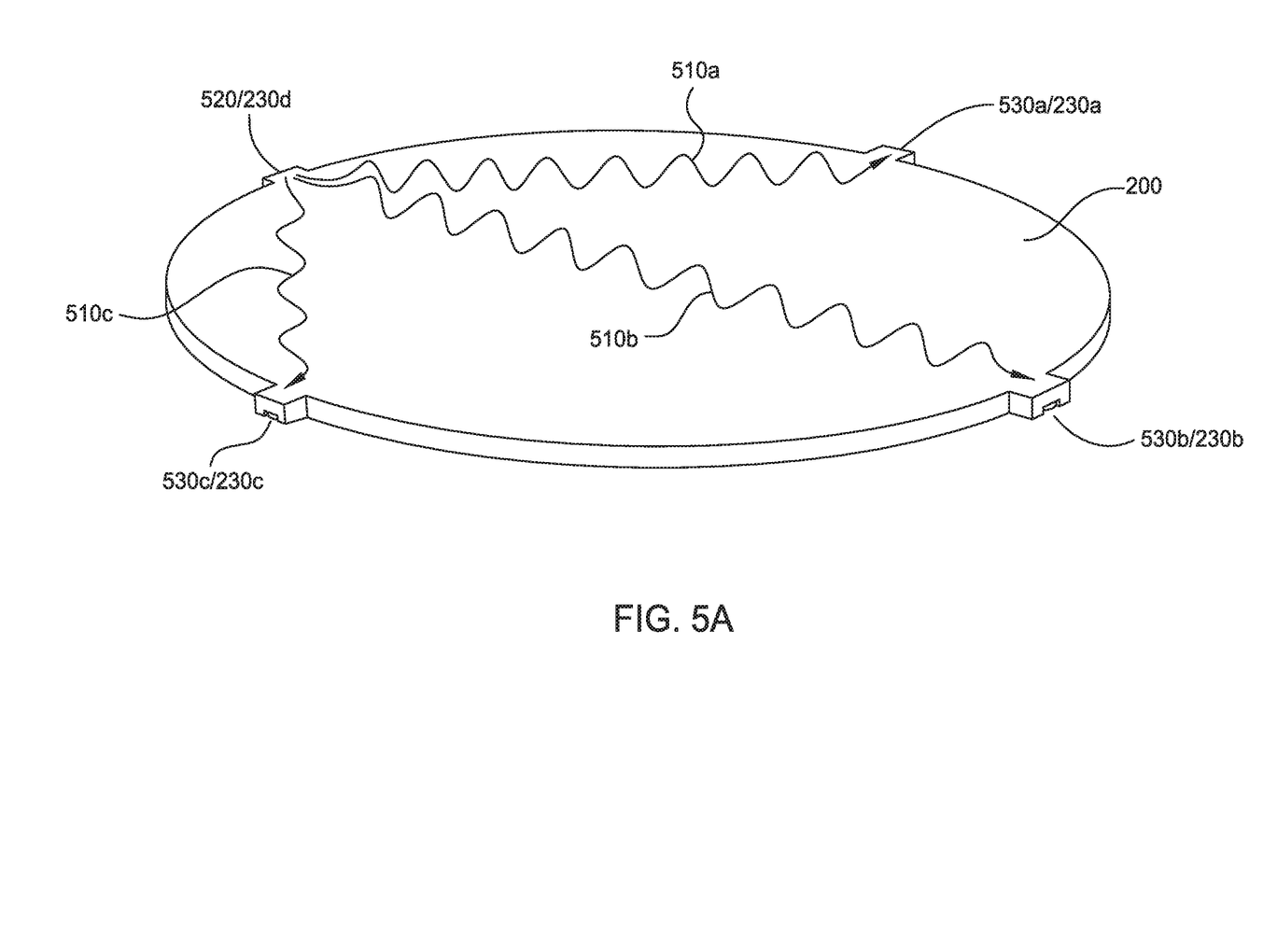
FIGS. 5A-5C illustrate wave propagation from a diagnostic patch, according to aspects of the present disclosure.
Figure 5B:
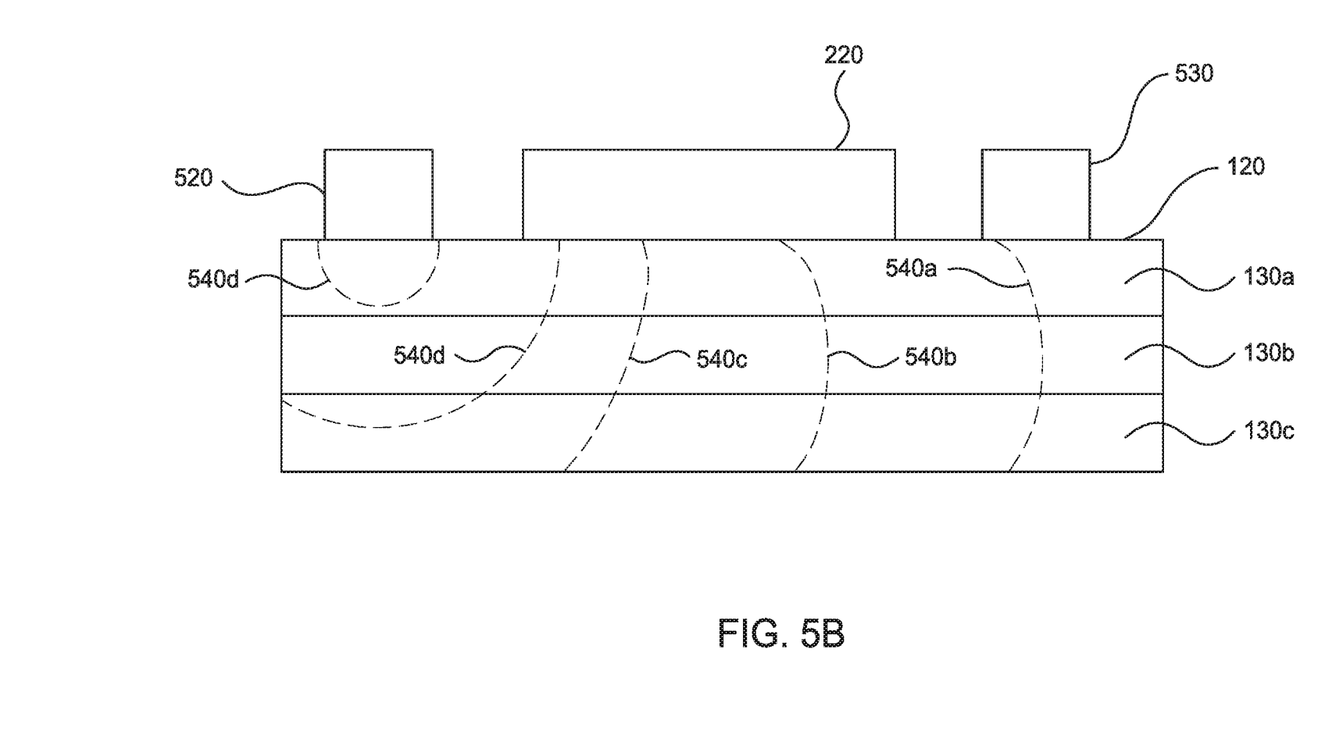
Figure 5C:
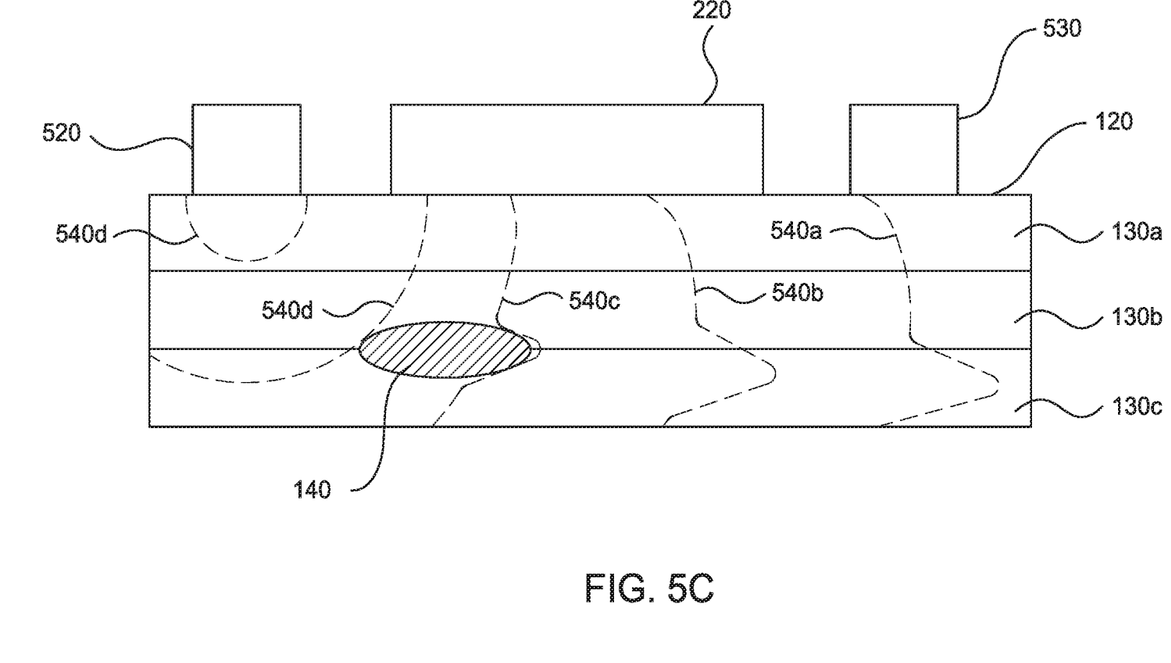

FIGS. 5A-5C illustrate the propagation of a wave for monitoring the health of a structure 110. FIG. 5A illustrates wave propagation in a first plane, in which the fourth transceiver 230$d$ is engaged as a transmitter 520 and the first, second, and third transceivers 230$a$-$c$ are engaged as receivers 530$a$-$c$ (generally, receiver 530). The transmitter 520 generates a signal carried in individual waveforms 510$a$-$c$ (generally, waveform 510) to the corresponding receivers 530$a$-$c$. At a second time, a different transceiver 230 may be the transmitter 520, and the other transceivers 230 are engaged as receivers 530. For example, a controller may cycle through the transceivers 230 to use as the transmitter 520, selecting the first transceiver 230$a$ at times (xn) to be the transmitter 520 and the second through fourth transceivers 230$b$-d to be the receivers 530, the second transceiver 230$b$ at times (xn+1) to be the transmitter 520 and the first, third, and fourth transceivers 230$a$, c, and d to be the receivers 530, etc.

FIG. 5B illustrates wave propagation in a second plane, perpendicular to the plane illustrated in FIG. 5A, in which a signal is carried through the material of the structure 110. The signal is generated at the transmitter 520, and penetrates into the material of the structure 110, to be carried to the receiver 530. The signal is illustrated in FIG. 5B as a series of topographic peaks 540$a$-$d$ (generally, peaks 540) that correspond to the amplitude peaks of the waveform 510 (or other positions in the waveform 510 sharing a particular phase value) propagating through the structure 110. The distances between the transmitter 520 and each receiver 530 are known so that a signal generated by the transmitter 520 carried on a given waveform 510 is expected to arrive at a corresponding receiver 530 at a known time from when the signal is generated based on the speed of propagation v in the material of the structure 110 and at a known signal strength based on the level of attenuation in the material.

If an imperfection 140 is present in the structure 110, such as is illustrated in FIG. 5C, the presence of the imperfection 140 affects the characteristics of the signal that the receiver 530 receives from the transmitter 520. In some aspects, an imperfection 140 affects the level of attenuation of the waveform 510; lowering or raising the signal strength from what is otherwise expected at the receiver 530. In some aspects, an imperfection 140 affects the speed of propagation v through the structure 110; affecting the time of reception to be sooner or later from what is otherwise expected at the receiver 530.

To identify whether a structure 110 includes any imperfections 140, a controller signals the transceivers 230 to generate baseline signals, which are compared against various tolerances set for the structure 110 as well as later-generated diagnostic signals to identify changes in the structure 110 over time. In various aspects, the tolerances for the structure 110 set thresholds for various characteristics of the signals related to the expected time-of-arrival, signal strength, signal reflectivity (e.g., due to the formation, growth, or other change in an imperfection 140), or frequency response (e.g., frequency/phase shift in the signal), which may be based on one or more of: the ideal material properties of the structure 110 (i.e., how the structure 110 is expected to behave if no imperfections 140 are present), a temperature of the structure 110, an altitude at which the structure 110 is operating, known or estimated effects of vibrations on the structure 110 during operations, and the like. In various aspects, the controller compares later-generated diagnostic signals (and the resulting diagnostic effects and characteristics thereof) against the tolerances as well as against earlier-generated diagnostic signals and the baseline signals (and the resulting baseline effects and characteristics thereof). Changes in the structure 110 over time, for example, due to the growth of imperfections 140 in the structure, are detected via corresponding changes over time to signal characteristics in the signals. For example, as an imperfection 140 grows, the level of attenuation in the amplitude of a signal may also grow, so that when the controller notes a decrease in signal amplitude beyond a given threshold, the controller can determine that the imperfection 140 has grown as the effect of that imperfection 140 on the signal has grown.

By using a plurality of transceivers 230, the controller can develop a multi-dimensional view of the structure 110 and where imperfections 140 are located in the structure 110. By cycling through which of the transceivers 230 is the transmitter 520 (with the remaining transceivers 230 acting as receivers 530), a controller can triangulate or determine via grid analysis, a location of an imperfection 140 by identifying which receivers 530 receive the waveform 510 within nominal bounds and which do not. For example, two or more waveforms 510 that intersect one another can indicate that an imperfection 140 is located at least at the point(s) of intersection.

Figure 6:
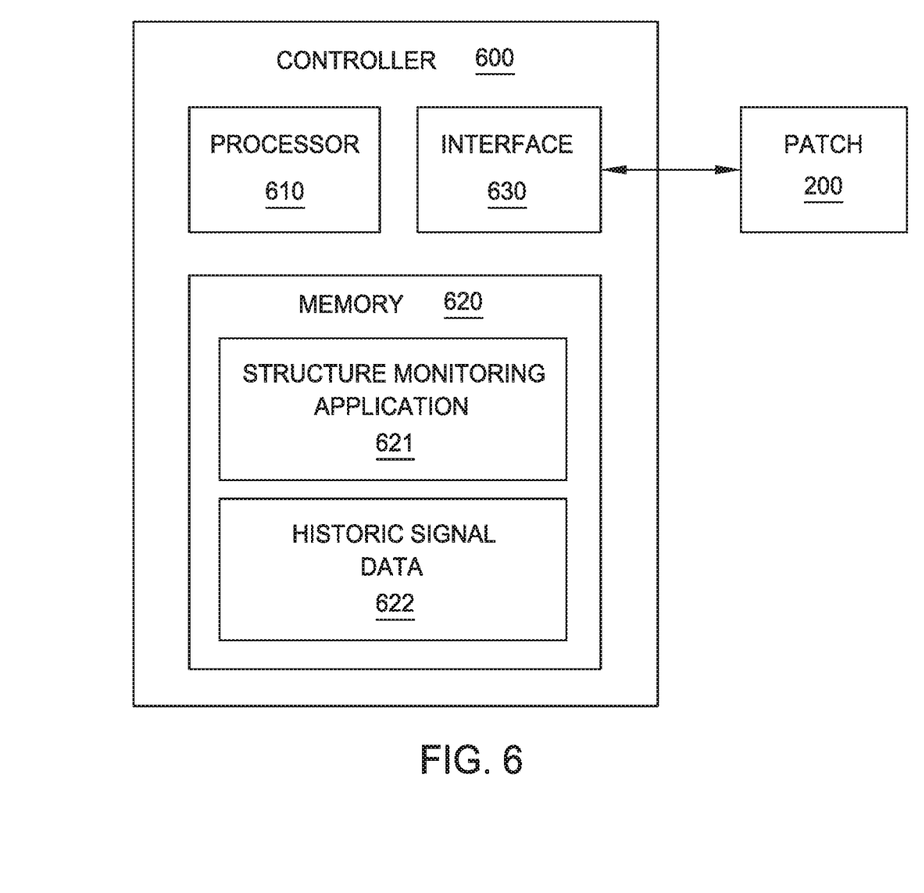
FIG. 6 illustrates example computing components of a controller, according to aspects of the present disclosure.

FIG. 6 illustrates example computing components of a controller 600 as discussed in relation to and in communication with the diagnostic patch 200. The controller 600 sends commands to the transceivers 230 to transmit baseline/diagnostic signals and receives signal data from the transceivers 230 during the course of operations. The controller 600 includes a processor 610, a memory 620, and an interface 630. The processor 610 and the memory 620 provide computing functionality to the diagnostic patch 200. The processor 610, which may be any computer processor capable of performing the functions described herein, executes commands based on inputs received from a user and the data received from the transceivers 230. The memory 620 may be one or more memory devices, such as, for example, Random Access Memory (RAM), Read Only Memory (ROM), flash memory, or any other type of volatile or non-volatile storage medium that includes instructions that the processor 610 may execute. The interface 630 connects the controller 600 to external devices, such as, for example, external memory devices, external computing devices, the transceivers 230, a power source, a wireless transmitter, etc., and may include various connection ports (e.g., Universal Serial Bus (USB), Firewire, Ethernet, coaxial jacks) and cabling.

The memory 620 generally includes various processor-executable instructions, that when executed by the processor 610, perform the various functions related to structural health monitoring discussed herein. The processor-executable instructions may generally be described or organized into various "applications" or "modules" in the memory 620, although alternate implementations may have different functions and/or combinations of functions. The memory 620 also generally includes data structures that store information for use by or output by the various applications or modules. In the present disclosure, the memory 620 includes at least instructions for structure monitoring application 621 and data structures for storing various historic signal data 622.

The historic signal data 622 are produced from the signals received from the transceivers 230 over a period of time and illustrate the transmissivity of the structure 110 (and any imperfections 140 therein) over the period of time. In various aspects, the historic signal data 622 are multi-dimensional views of the structure 110 at specific times correlated between an array of transceivers 230 operating in a pitch-catch arrangement. The historic signal data 622 include both baseline signals and diagnostic signals, which are stored in a time series according to the times at which the signals were transmitted and received.

The structure monitoring application 621 may correlate various data points based on a given transmitting transceiver 230/520, a given receiving transceiver 230/530, various regions of the structure 110, a wavelength of waveform 510 used to monitor the health of the structure 110, or various other criteria. In various aspects, the structure monitoring application 621 analyzes the signal characteristics of the historic signal data 622 to identify when to generate an alert based on various thresholds based on the size, location, or growth rate of various imperfections 140 in the structure 110.

Figure 7:
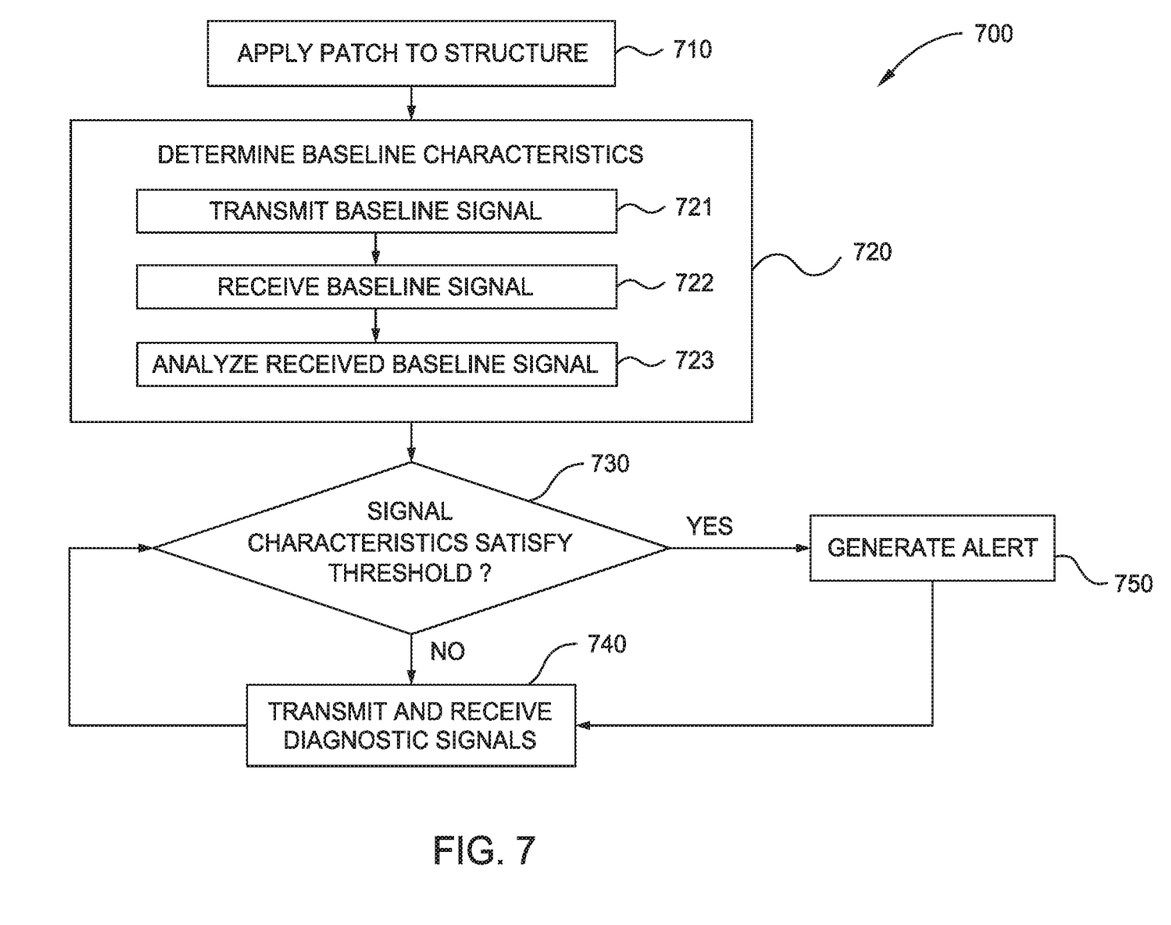
FIG. 7 is a flowchart of a method of using a diagnostic patch, according to aspects of the present disclosure.

FIG. 7 is a flowchart of a method 700 of using a diagnostic patch 200 to monitor the health of a structure 110. Method 700 begins with block 710, where a user applies a diagnostic patch 200 to a structure 110. In various aspects, the user applies an adhesive to the surface 120 of the structure 110, applies an adhesive to the mounting area 240 of the patch 200, or exposes a pre-applied adhesive on the mounting area 240 and places the patch 200 on the surface 120 of the structure 110. The adhesive chosen may be matched to the material of the structure 110 to ensure a strong bond between the patch 200 and the structure 110. In various aspects, the adhesive is selectively removable by various solvents, mechanical forces, applied temperatures/lights, etc. to allow the user to remove the patch 200 from the structure 110 when analysis of the structure 110 is complete.

The user may select a diagnostic patch 200 based on the size and shape of the patch 200, number and position of transceivers 230, the frequencies at which the transceivers 230 are tuned to generate and receive signals, material composition of the patch 200 relative to the structure 110, etc. In some aspects, in addition to providing the user with diagnostic information on any imperfections 140 present within a portion of the structure 110, the diagnostic patch 200 further protects the structure 110 from impacts and arrests the growth of imperfections 140 by holding portions of the structure 110 in place. Because the diagnostic patch 200 is held in contract with the surface 120, the diagnostic patch 200 may remain attached to the structure 110 while the structure 110 is in use. For example, the structure 110 may be a portion of an aircraft that the patch 200 monitors while inflight, a portion of a ship that the patch 200 monitors while underway, a portion of a building that is occupied, etc. so that the patch 200 can both protect the structure 110 and monitor the health of the structure 110 while in use or otherwise operational. The data collected regarding the health of the structure 110 may be associated with other operational data from the vehicle or other system to which the structure 110 belongs to thereby associate changes in imperfections 140 or the detection of imperfections 140 with various operational phases for the structure 110.

Once applied, the diagnostic patch 200 holds at least one plurality of transceivers 230 in contact with the structure 110 so that the face 420 of the mounting area 220 and the faces 430 of the transceivers 230 are coplanar and in contact with the surface 120. The transceivers 230 are mounted around the perimeter 250 of the diagnostic patch 200 and are located at known distances from one another.

At block 720, a controller 600 determines baseline characteristics for the portion of the structure 110 on which the diagnostic patch 200 is affixed. Each transceiver 230, at block 721, transmits a baseline signal to each other transceiver 230 included in the patch 200. Each of the other transceivers 230 receive the baseline signal at block 722, and the controller 600 analyzes the received baseline signals relative to the expected values for those baseline signals to determine the baseline characteristics for the structure 110.

At block 730, the controller 600 determines whether the signal characteristics satisfy various alert thresholds, including static thresholds and dynamic thresholds. For example, a decrease in signal amplitude of at least X dB is correlated to an imperfection of at least size Y. In another example, an increase in time of flight of at least X us is correlated to an imperfection of at least size Y. The controller 600 may be preprogrammed to identify and correlate the various effects of various different types of imperfections on the signal characteristics of the signals transmitted between the transceivers 230.

The static thresholds identify various sizes, locations, numbers, and combinations thereof for imperfections 140 that result altered signal characteristics. The dynamic thresholds identify various changes in the sizes, locations, and numbers and combinations thereof for imperfections 140 (i.e., a rate of growth for an imperfection) from what is identified in the baseline signals. For example, a static threshold for length may specify that when an imperfection 140 of at least a predetermined length is identified that an alert is to be generated, but a dynamic threshold for length may specify that when an imperfection 140 has grown in length by X % from what was identified at the time the baseline signals were analyzed that an alert is to be generated, even if the total length does not satisfy the static threshold. Because the material properties (such as the speed of propagation and level of attenuation over distance) for the structure 110 are known, and the distances between the transceivers 230 are known, the controller 600 may compare the baseline signals or any subsequently generated diagnostic signal against various static thresholds. The controller 600 may compare various diagnostic signals against earlier-generated diagnostic signals and/or the baseline signals to determine if the imperfections 140 identified in the structure are growing beyond a dynamic threshold.

Method 700 proceeds to block 740 in response to identifying changes in signal characteristics that satisfy a dynamic threshold or identifying signal characteristics that satisfy a static threshold. In various aspects, the controller 600 stores the alert for retrieval by another device or transmits the alert to an external device to indicate the alert to a user. In some aspects, the patch 200 includes a Light Emitting Diode (LED), a display device, a buzzer or other noise maker, etc. that is provided power in response to generating the alert to indicate the alert to a user. In various aspects, the controller 600 may continue to generate new alerts in response to detecting additional signal characteristics that are associated with imperfections 140 satisfying a dynamic or static threshold, but maintains generated alerts until cleared by a user regardless to whether the signal characteristics later do not satisfy the dynamic or static threshold for which the alert was originally generated. For example, a structure 110 that is subject to wide temperature ranges during operation may exhibit imperfections 140 sufficient to satisfy a threshold at a first temperature, but may not exhibit imperfections 140 sufficient to satisfy that threshold at a second temperature (e.g., due to material expansion/contraction), and an alert may therefore be maintained regardless of the current temperature of the structure 110.

Method 700 proceeds to block 750 from block 730 or block 740, where the controller 600 causes the plurality of transceivers 230 included in the diagnostic patch 200 to transmit and receive diagnostic signals to monitor the health of the structure 110. The transceivers 230 of the diagnostic patch 200 operate in a pitch-and-catch arrangement, in which the first transceiver 230a is the transmitter 520 at a first time, a second transceiver 230b is the transmitter 520 at a second time, etc. The controller 600 sets the time window in which the individual transceivers 230 act as transmitters 520 to not overlap, to thereby reduce the potential for interference between the various signals. In aspects including multiple pluralities of transceivers 230 tuned to different frequencies, the controller 600 may set the time windows to allow multiple transmitters 520 (from different pluralities of transceivers 230) to transmit at overlapping times when the bandwidth between the different frequencies is sufficient to avoid crosstalk or interference between the separate pluralities, or may cause the multiple transmitters 520 to transmit diagnostic signals at times that do not overlap one another.

According to the cycle and the selected time windows, the controller 600 causes a given transceiver 230 to transmit a diagnostic signal at a given time, interprets the received diagnostic signals, and returns to block 730 to determine whether the characteristics of received diagnostic signals indicate that an imperfection is present that satisfies a static threshold or is has grown enough to satisfy a dynamic threshold. When method 700 returns for a subsequent iteration of block 730, the controller 600 selects a different transceiver 230 of the plurality of transceivers 230 to transmit a diagnostic signal at a subsequent time. The method 700 may cycle through every transceiver 230 in the plurality of transceivers 230 in a set order, or may randomly select a different transceiver 230 to use at a subsequent time.

Method 700 may continue so long as the patch 200 is affixed to the structure or a user signals the control 600 to stop collecting and analyzing data regarding the structure 110.

In the current disclosure, reference is made to various aspects. However, it should be understood that the present disclosure is not limited to specific described aspects. Instead, any combination of the following features and elements, whether related to different aspects or not, is contemplated to implement and practice the teachings provided herein. Additionally, when elements of the aspects are described in the form of "at least one of A and B," it will be understood that aspects including element A exclusively, including element B exclusively, and including element A and B are each contemplated. Furthermore, although some aspects may achieve advantages over other possible solutions and/or over the prior art, whether or not a particular advantage is achieved by a given aspect is not limiting of the present disclosure. Thus, the aspects, features, aspects and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects described herein may be embodied as a system, method or computer program product. Accordingly, aspects may take the form of an entirely hardware aspect, an entirely software aspect (including firmware, resident software, micro-code, etc.) or an aspect combining software and hardware aspects that may all generally be referred to herein as a "circuit," "module" or "system." Furthermore, aspects described herein may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to aspects of the present disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various aspects of the present disclosure. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

While the foregoing is directed to aspects of the present disclosure, other and further aspects of the disclosure may be devised without departing from the basic scope thereof, and the scope thereof is determined by the claims that follow.

What is claimed is:

1. A patch device, comprising:
a mounting area;
a first plurality of ultrasound transceivers mounted at a first plurality of locations around a perimeter of the mounting area with a regular interval between adjacent ultrasound transceivers of the first plurality of ultrasound transceivers, wherein the first plurality of locations are spaced to provide a plurality of known distances between the first plurality of ultrasound transceivers across the mounting area;
a second plurality of ultrasound transceivers mounted at a second plurality of locations around the perimeter of the mounting area, wherein the second plurality of locations are spaced to provide a plurality of known distances between the second plurality of ultrasound transceivers across the mounting area, wherein the first plurality of ultrasound transceivers are configured to transmit and receive signals in a first bandwidth that propagate at a first depth in a structure to which the patch device is mounted and the second plurality of ultrasound transceivers are configured to transmit and receive signals in a second bandwidth that propagate at a second depth in the structure different than the first depth; and
an adhesive layer disposed on the mounting area, configured to temporarily secure the mounting area to a surface of a structure and hold the first plurality of ultrasound transceivers and the second plurality of ultrasound transceivers in contact with the surface.

2. The patch device of claim 1, wherein a material comprising the mounting area is selected as a different material from the structure.

3. The patch device of claim 1, wherein the first plurality of ultrasound transceivers comprises two ultrasound transceivers located on opposite sides of the mounting area.

4. A system, comprising:
a diagnostic patch, including:
a plurality of transceivers located at known distances from one another around a perimeter of the diagnostic patch with a regular interval between adjacent transceivers of the plurality of transceivers; and
a mounting area configured to selectively secure the diagnostic patch to a surface of a structure and hold the plurality of transceivers in contact with the surface; and
a controller in communication with the diagnostic patch, the controller configured to:
cause the plurality of transceivers to transmit a corresponding plurality of baseline signals into the structure at a plurality of known depths relative to the surface of the structure;
interpret the plurality of baseline signals as received by the plurality of transceivers to determine a baseline effect of an imperfection in the structure on signal characteristics;

cause the plurality of transceivers to transmit a corresponding plurality of diagnostic signals into the structure at the plurality of known depths;

interpret the plurality of diagnostic signals as received by the plurality of transceivers to determine a diagnostic effect of the imperfection on the signal characteristics; and in response to a difference between the baseline effect and the diagnostic effect exceeding a threshold, generate an alert.

5. The system of claim 4, wherein the controller is further configured to:

cause a first subset of the plurality of transceivers to transmit the corresponding plurality of baseline signals and the corresponding plurality of diagnostic signals at a first frequency; and cause a second subset of the plurality of transceivers to transmit the corresponding plurality of baseline signals and the corresponding plurality of diagnostic signals at a second frequency different from the first frequency.

6. The system of claim 4, wherein the difference between the baseline effect and the diagnostic effect identifies at least one of:

a change in signal amplitude;
a change in signal time-of-flight;
a change in a frequency response; and
a change in signal reflections from the imperfection.

7. The system of claim 4, wherein to cause the plurality of transceivers to transmit the corresponding plurality of baseline signals into the structure, the controller is configured to:

select one transceiver of the plurality of transceivers to use as a transmitter in a first time window;

transmit one baseline signal of the plurality of baseline signals during the first time window;

receive the one baseline signal at remaining transceivers of the plurality of transceivers during the first time window; and cycle to a different one transceiver of the plurality of transceivers to use as the transmitter in a subsequent time window.

8. The system of claim 4, wherein the threshold is a dynamic threshold for a rate of growth in the imperfection from the baseline effect.

9. A method, comprising:

transmitting, at a first time, a first ultrasound signal from a first transceiver of a first plurality of transceivers in contact with a structure, wherein the first ultrasound signal is transmitted at a first known depth in the structure;

receiving the first ultrasound signal carried in the structure at a second transceiver of the first plurality of transceivers at a known distance from the first transceiver on an opposite side of an imperfection in the structure relative to the first transceiver;

determining a first baseline signal characteristic of the first ultrasound signal as received at the second transceiver;

transmitting, at a second time, a second ultrasound signal from a third transceiver of a second plurality of transceivers in contact with the structure, wherein the second ultrasound signal is transmitted at a second known depth in the structure different from the first known depth;

receiving the second ultrasound signal carried in the structure at a fourth transceiver of the second plurality of transceivers at a second known distance from the third transceiver;

determining a second baseline signal characteristic of the second ultrasound signal as received at the fourth transceiver;

transmitting, at a third time, a third ultrasound signal from the first transceiver of the first plurality of transceivers at the first known depth;

receiving the third ultrasound signal carried in the structure at the second transceiver;

determining a first diagnostic signal characteristic of the third ultrasound signal as received at the second transceiver;

transmitting, at a fourth time, a fourth ultrasound signal from the third transceiver of the second plurality of transceivers at the second known depth;

receiving the fourth ultrasound signal carried in the structure at the fourth transceiver;

determining a second diagnostic signal characteristic of the fourth ultrasound signal as received at the fourth transceiver; and in response to determining that a difference between at least one of the first baseline signal characteristic and the first diagnostic signal characteristic or the second baseline signal characteristic and the second diagnostic signal characteristic exceeds a threshold, generating an alert.

10. The method of claim 9, further comprising:

affixing the first transceiver and the second transceiver to a surface of the structure via a patch having a face defining the known distance between the first transceiver and the second transceiver and including an adhesive layer mounting the face to the structure, wherein the first transceiver and the second transceiver are located on a perimeter of the patch.

11. The method of claim 10, wherein the patch is made of a material different from the structure.

12. The method of claim 9, further comprising:

receiving the first ultrasound signal carried in the structure at a fifth transceiver of the first plurality of transceivers at a second known distance from the first transceiver;

determining a third baseline signal characteristic of the first ultrasound signal as received at the fifth transceiver;

receiving the second ultrasound signal carried in the structure at the fifth transceiver;

determining a third diagnostic signal characteristic of the second ultrasound signal as received at the fifth transceiver; and in response to determining that a difference between the third baseline signal characteristic and the third diagnostic signal characteristic exceeds the threshold, generating a second alert.

13. The method of claim 9, further comprising:

transmitting, at a fifth time, a fifth ultrasound signal from the second transceiver of the first plurality of transceivers in contact with the structure;

receiving the fifth ultrasound signal carried in the structure at the first transceiver of the first plurality of transceivers at the known distance from the second transceiver;

determining a third baseline signal characteristic of the third fifth ultrasound signal as received at the first transceiver;

transmitting, at a sixth time, a fourth sixth ultrasound signal from the second transceiver of the first plurality of transceivers;

receiving the sixth ultrasound signal carried in the structure at the first transceiver;

determining a third diagnostic signal characteristic of the sixth ultrasound signal as received at the first transceiver; and in response to determining that a third difference between the second third baseline signal characteristic and the third diagnostic signal characteristic exceeds the threshold, generating a second alert.

14. The method of claim 9, wherein the difference between the first baseline signal characteristic and the first diagnostic signal characteristic indicates at least one of:

a change in signal strength from the first time to the second time;

a change in signal propagation speed through the structure from the first time to the second time;

a change in a frequency response; and a change in signal reflections from an imperfection included in the structure.

15. The method of claim 9, wherein the structure is a component of a vehicle that is in operation at the second time.

16. The method of claim 15, wherein ultrasound signals are transmitted and received at known times and signal characteristics of the ultrasound signals are stored in association with operational phases of the vehicle that correspond to the known times.

17. The method of claim 9, wherein the threshold is a dynamic threshold to identify a rate of growth in an imperfection included in the structure from the first time to the fourth time.

18. The method of claim 9, wherein ultrasound signals are transmitted and received in a pitch-catch arrangement in which each transceiver of the first plurality of transceivers transmits a diagnostic signal in a given time window to remaining transceivers of the first plurality of transceivers.

19. The patch device of claim 1, wherein characteristics of the signals transmitted and received by the first plurality of ultrasound transceivers and the second plurality of ultrasound transceivers are stored in association with operational phases of a vehicle to which the patch device is attached.

20. The patch device of claim 1, wherein the first plurality of ultrasound transceivers alternate in placement around the perimeter of the mounting area with the second plurality of ultrasound transceivers.

* * * * *

UNITED STATES PATENT AND TRADEMARK OFFICE
CERTIFICATE OF CORRECTION

PATENT NO. : 11,255,820 B2  
APPLICATION NO. : 16/249361  
DATED : February 22, 2022  
INVENTOR(S) : Shahrooz M. Jahanbin et al.

Page 1 of 1

It is certified that error appears in the above-identified patent and that said Letters Patent is hereby corrected as shown below:

In the Claims

In Column 16, Line 66, in Claim 13, before "fifth" delete "third".

In Column 17, Line 1, in Claim 13, after "time, a" delete "fourth".

In Column 17, Line 10, in Claim 13, before "third" delete "sccond".

Signed and Sealed this  
Twenty-fourth Day of January, 2023

Katherine Kelly Vidal  
*Director of the United States Patent and Trademark Office*